United States Patent
Fernholz et al.

[15] 3,670,014
[45] June 13, 1972

[54] PROCESS FOR THE MANUFACTURE OF ALLYL ESTERS OF CARBOXYLIC ACIDS

[72] Inventors: Hans Fernholz, Fischbach/Taunus; Hans-Joachim Schmidt, Frankfurt am Main; Friedrich Wunder, Florsheim am Main, all of Germany

[73] Assignee: Farbwerke Hoechst Aktiengesellschaft vormals Meister Lucius & Bruning, Frankfurt am Main, Germany

[22] Filed: July 16, 1969

[21] Appl. No.: 842,329

[30] Foreign Application Priority Data

July 19, 1968 Germany .......................P 17 68 984.8
Nov. 2, 1968 Germany .......................P 18 06 761.3

[52] U.S. Cl. ..........................................................260/497 A
[51] Int. Cl. ............................................................C07c 67/04
[58] Field of Search ...............................................260/497 A

[56] References Cited

UNITED STATES PATENTS 3,300,528  1/1967  Wakasa et al. ....................260/417 A

FOREIGN PATENTS OR APPLICATIONS 747,415    11/1966  Canada
676,728    4/1968   Republic of South Africa
981,987    2/1965   Great Britain ..................260/497 A
1,003,347  9/1965   Great Britain
1,017,938  1/1966   Great Britain
1,047,835  11/1966  Great Britain
1,117,595  6/1968   Great Britain
1,191,366  4/1965   Germany ..........................260/497 A
1,296,621  6/1969   Germany ..........................260/497 A

OTHER PUBLICATIONS

Levenspiel Chemical Reaction Engineering, Wiley (1962) pp. 464–465

*Primary Examiner*—Lorraine A. Weinberger
*Assistant Examiner*—Richard D. Kelly
*Attorney*—Curtis, Morris & Safford

[57] ABSTRACT

Preparation of allyl esters of carboxylic acids in the gaseous phase by reacting propylene, oxygen and carboxylic acids at elevated temperatures in the presence of a catalyst consisting of an inert carrier and a salt of a noble metal of the 8th group of the periodic system and 0.01 to 20 per cent by weight of bismuth.

7 Claims, No Drawings

PROCESS FOR THE MANUFACTURE OF ALLYL ESTERS OF CARBOXYLIC ACIDS

The present invention relates to a process for the manufacture of allyl esters of carboxylic acids.

It has been proposed to produce allyl acetate by reacting allyl alcohol with acetic acid. It has also been proposed to make allyl acetate by reacting propylene with acetic acid in the presence of compounds of the noble metals of the eighth group of the Mendeleeff Periodic Table, by carrying out the reaction in the presence of molecular oxygen and redox systems which reversibly change their valency under the reaction conditions. This process may be carried out, for example, in the liquid phase at temperatures within the range of from 60° to 160° C under propylene partial pressures within the range of from 5 to 50 kg/cm². By such processes, however, only 7 to 30 mol per cent of propylene is reacted to allyl acetate. The remaining proportion is converted to propenyl- or iso-propenyl acetate and other by-products such as acrolein and carbon oxides. It has furthermore been proposed to make allyl acetate from propylene, oxygen and acetic acid in the presence of palladium metal catalysts at temperatures within the range of from 50° to 250° C in the liquid or gaseous phase, in which process, however, considerable amounts of acetone are formed as by-product.

Since the catalysts hitherto used for the manufacture of allyl esters of carboxylic acids have only a short life, they are in general only little suitable for use in industry.

The present invention provides a process for the selective manufacture of allyl esters of carboxylic acids in the gaseous phase by reacting propylene, oxygen or gases containing oxygen, and carboxylic acids at elevated temperatures in the presence of catalysts consisting of an inert carrier material, at least one salt of at least one noble metal of the eighth sub group of the Mendeleeff Periodic Table, preferably the palladium salt of the carboxylic acid to be reacted, and optionally salts of the metals of the first and second main or sub group of the Mendeleeff Periodic Table, which comprises conducting the starting substances over catalysts containing 0.01 to 20 percent by weight, preferably 0.1 to 5 percent by weight, calculated on the catalyst, of bismuth, preferably in the form of a salt thereof, and optionally redox systems. Using the said mixed catalysts, the process of the invention leads to high space-time yields and yields over 96 percent of allyl esters of carboxylic acids calculated on the propylene reacted.

In the process in accordance with the invention, the bismuth may be used in the metallic form, but is advantageously used in the form of a bismuth salt.

Particularly good results are obtained by using the bismuth in the form of a salt thereof with a carboxylic acid, preferably the salt of the carboxylic acid to be reacted. The bismuth carboxylates may also be produced in situ on the catalyst, for example, from bismuth hydroxide, bismuth oxide or metallic bismuth and oxidizing agents.

It is particularly advantageous to use the bismuth in such a form, for example as bismuth hydroxide or bismuth oxide that it can form a basic or neutral carboxylate under the reaction conditions.

In special cases, the process of the invention may even be carried out successfully with an amount of bismuth smaller than 0.01 percent by weight calculated on the mixed catalyst.

The process of the invention is applicable to the reactio of saturated aliphatic, cycloaliphatic, araliphatic or aromatic carboxylic acids containing one or more carboxyl groups. It is essential, however, that the carboxylic acid be volatile under the reaction conditions and be free from olefinic double bonds. The carboxylic acid therefore generally has at most 10 carbon atoms. It is advantageous to use unsubstituted saturated aliphatic monocarboxylic acids with 2 to four carbon atoms, for example, propionic acid, n-butyric acid and i-butyric acid, and preferably acetic acid.

The oxygen may be used in a pure elementary form or in admixture with inert gases, for example in the form of air or of a mixture of oxygen and carbon dioxide. When carrying out the process in industry it is advantageous in many cases to use mixtures of propylene and oxygen that are outside the known explosive range.

The oxygen is advantageously introduced in a manner such that the partial pressure of oxygen is slowly increased in the initial period. In this manner a considerably improved catalytic action is obtained in the manufacture of allyl esters of carboxylic acids, for example allyl acetate. This improved catalytic action can be explained by the formation of a particularly active form of the catalyst which is not obtained when the oxygen pressure is increased more rapidly within a shorter period of time.

When carrying out the process in industry it is particularly advantageous to continuously return any unreacted proportions of starting products to the reactor after complete or partial separation of the reaction products, the consumed proportion of starting products being replaced in each case.

Suitable salts of the noble metals of the 8th sub group of the Mendeleeff Periodic Table are those of ruthenium, rhodium, iridium, platinum and preferably palladium. Corresponding mixtures of noble metal salts may also be used. It is particularly advantageous to use the noble metals in the form of their salts with the carboxylic acid to be reacted. When, for example, propylene is reacted with acetic acid, palladium acetate is advantageously used as the catalyst.

As carrier material for the catalyst a great many different inert materials may be used. Examples of such materials are activated carbon, titanium dioxide, titanium silicate, zirconium oxide, zirconium silicate, zirconium phosphate and alumina, furthermore silicates such as, for example, calcined clay or aluminosilicates, silicon carbide and silica gel. It is particularly advantageous to use a silicic acid having a specific surface within the range of from 40 to 500 m²/g, preferably 40 to 300 m²/g, and a mean pore radius within the range of from 50 to 2,000 A.

The reaction is advantageously carried out in the presence of at least one salt of the first or second main or sub group of the Mendeleeff Periodic Table, preferably in the presence of at least one alkali metal salt of the carboxylic acid to be reacted. Preferably the sodium salts and still more advantageously the potassium salts are used. The said salts are advantageously used in amounts within the range of from 0.1 to 25 percent, preferably 1 to 10 percent, calculated on the weight of the mixed catalyst consisting of carrier material and catalytic substance.

In a particularly advantageous form of carrying out the process in industry, the alkali metal salts of the carboxylic acids are added continuously or discontinuously to the mixed catalyst during the reaction. When adding the said alkali metal salts continuously, 0.1 to 400 ppm, preferably 1 to 100 ppm, of alkali metal salt, calculated on the carboxylic acid, are used.

Although it is not necessary in the process of the invention to use redox systems carrying oxygen, the yield is still increased in many cases by such redox systems. As redox systems there may be used the known organic and advantageously the inorganic redox systems which reversibly change their oxidation stages under the reaction conditions, thus accelerating the catalytic reaction. Suitable inorganic redox systems are, for example, the salts of metals that reversibly change their valency, for example, the salts of copper, iron, manganese, cerium, vanadium, antimony, lead, chromium and titanium, the salts of copper and of cerium being most suitable.

Another advantageous form of the process of the invention by which a reduction of the selectivity of the catalyst in a prolonged operation is prevented to a large extent, consists in periodically or continuously changing the part of catalyst that comes first into contact with the reaction gases. This is achieved by periodically reversing the direction of flow of the reaction gases over the catalyst or by periodically or continuously removing part of the catalyst at the inlet of the reactor and correspondingly adding the removed part of catalyst at the outlet of the reactor so that the catalyst is circulated in countercurrent to the stream of reaction gases.

Each of these measures has substantially the same effect. In this manner the catalyst may be passed through a cycle in a determined period of time, for example every three weeks.

In another form of the last mentioned mode of executing the process of the invention, the change of the part of catalyst that comes first into contact with the reaction gases is effected by continuously or periodically mixing the catalyst. In a vertically arranged reactor the flow of the gases introduced from below may, for example, be increased for a short time so strongly that mixing of the catalyst takes place.

In still another form, a fluidized catalyst is used. By fluidized catalyst there is meant a fine-grained catalyst of such a particle size that it is constantly kept in motion in the form of a fluidized bed at the speed of flow of the reaction gases prevailing under the reaction conditions. In this preferred mode of executing using a fluidized bed, which enables the effectiveness of the catalyst to be considerably improved in many cases, it is particularly advantageous to use a spherical (microspheroidal) silicic acid of a particle diameter of 0.08 to 2 millimeters, preferably 0.1 to 0.2 millimeter, as catalyst carrier.

The process in accordance with the invention is carried out at a reaction temperature within the range of from 0° to 300° C, preferably 120° to 250° C, under a pressure within the range of from 0 to 25 atmospheres gage, preferably 2 to 10 atmospheres gage.

The following examples serve to illustrate the invention, but are not intended to limit it.

EXAMPLE 1

Nine hundred seventy grams of a silicic acid carrier were impregnated with a solution of 40 grams of bismuth nitrate in 735 milliliters of water and 67 milliliters of concentrated nitric acid. The dried catalyst was placed in a vessel containing 2 liters of a 5 percent potassium hydroxide solution. After the solid substance had deposited, the supernatant potassium hydroxide solution was decanted and replaced by water. The catalyst was then suction filtered, dried, impregnated with a solution of 40 grams of potassium acetate and 21.5 grams of palladium acetate in 730 milliliters of acetic acid and finally dried at 50° C in vacuo. The finished mixed catalyst contained about 1.95 percent by weight of palladium diacetate, 6.5 percent by weight of potassium acetate and 1.56 percent by weight of bismuth in the form of acetates.

Two liters of the above catalyst were introduced into a reaction tube. Under a pressure of 5 atmospheres gage a mixture of 650 Nl (liters measured under normal conditions of temperature and pressure) of nitrogen, and 20 Nl of oxygen was passed over the catalyst per hour and the catalyst was heated to 170° C within 1 hour. During heating there were added to the gas stream, per hour, 140 grams of acetic acid after a temperature of 100° C had been reached, and then 1,600 Nl of propylene after a temperature of 130° C had been reached. While further heating the catalyst to 170° C, the introduction of acetic acid was increased to 2,000 grams per hour and then the introduction of oxygen was gradually increased to 196 Nl per hour in the course of 36 hours. An average catalyst yield of 245 grams of allyl acetate per liter of catalyst and per hour was obtained, which remained unchanged even after 1,000 hours of working. The yield of allyl acetate calculated on the propylene which had undergone reaction was 97 %· 3 % of the propylene reacted had been converted to carbon dioxide and water.

EXAMPLE 2

Under a pressure of 5 atmospheres gage 650 Nl of nitrogen were passed per hour without oxygen over 2 liters of a fresh catalyst having the same composition as described in Example 1. The catalyst was heated to 170° C within 1 hour. As described in Example 1, 140 grams per hour of acetic acid were added to the gas stream after a temperature of 100° C had been reached, and 1,600 Nl per hour of propylene after a temperature of 130° C had been reached. While further raising the temperature, the amount of acetic acid was increased to 2,000 grams per hour, corresponding to the vapor pressure, so that when the final temperature of the catalyst of 170° C had been reached, about 3.0 $Nm^3$ (N meaning under normal conditions of temperature and pressure) of a gas mixture consisting of 21.7 percent by volume of nitrogen, 53.5 percent by volume of propylene and 24.9 percent by volume of acetic acid were passed over the catalyst per hour. 195 Nl of oxygen were added to this gas mixture within 2 hours. Under these conditions which corresponded to the final reaction conditions of Example 1, a constant catalyst yield of 165 grams of allyl acetate per liter of catalyst and per hour was obtained. The yield of allyl acetate was 96 percent calculated on the propylene which had undergone reaction. About 4 percent of the reacted propylene had been converted to carbon dioxide and water.

EXAMPLE 3

A catalyst prepared in the manner described in Example 1 with the use of bismuth hydroxide was impregnated with a solution of 40 grams of potassium acetate, 21.5 grams of palladium acetate and 2.8 grams of copper acetate in 730 milliliters of acetic acid and dried at 50° C in vacuo.

Propylene, acetic acid, oxygen and nitrogen were passed over 2 liters of the above catalyst under the conditions described in Example 1. After the final reaction conditions had been reached, the new catalyst yielded 285 grams of allyl acetate per liter of catalyst and per hour, which remained unchanged even after 800 hours. The yield of allyl acetate was 95 percent calculated on the propylene which had undergone reaction. The residual amount of 5 percent was reacted to carbon dioxide and water.

COMPARISON EXAMPLE 1

Under the conditions of Example 1, a mixture of propylene, acetic acid, oxygen and nitrogen was passed over 2 liters of a catalyst which had been obtained in known manner by applying a solution of 21.5 grams of palladium acetate, 40 grams of potassium acetate and 40 grams of cadmium acetate to 970 grams of a silicic acid carrier and then drying it. A catalyst yield of 270 grams of allyl acetate per liter of catalyst and per hour was obtained, which dropped, however, to 215 grams after 100 hours of working and to 60 grams after 500 hours of working. The yield of allyl acetate was about 95 percent. The remaining proportion of about 5 percent had been reacted to carbon dioxide and water.

COMPARISON EXAMPLE 2

By using a catalyst containing 0.7 percent by weight of palladium metal, 0.3 percent by weight of gold and 4 percent by weight of potassium acetate, supported on a silicic acid carrier, while otherwise proceeding as described in Comparison Example 1, a maximum catalyst yield of 210 grams of allyl acetate per liter of catalyst and per hour was obtained. After 100 hours of working, the catalyst yield was only 135 grams and after 500 hours only 45 grams of allyl acetate per liter of catalyst and per hour.

EXAMPLE 4

13 Nl of nitrogen, 32 Nl of propylene, 40 grams of acetic acid and 3.9 Nl of oxygen were passed per hour at 170° C under atmospheric pressure over 200 milliliters of the catalyst described and used in Example 1. A space-time yield of 32 g/l·h of allyl acetate was obtained. The yield of allyl acetate calculated on the propylene which had been reacted was 95 percent.

EXAMPLE 5

For continuously carrying out the process an apparatus was used which consisted of a reaction tube 4,500 millimeters long and 32 millimeters in diameter, pumps for gas and liquid, a gas compressor, an acetic acid evaporator, a condenser and a condensation vessel. The oxygen was added to the recycle gas before the acetic acid evaporator. Fresh propylene was introduced on the sucking side of the compressor. The carbon dioxide formed as a by-product was removed from the system as waste gas to such an extent that a concentration of carbon dioxide of about 20 percent by volume was maintained in the recycle gas (without acetic acid).

The reactor was filled with 3.6 liters of the catalyst of Example 1. 8.5 Nm³ of recycle gas consisting of about 72 percent by volume of propylene, 8 percent by volume of oxygen and 20 percent by volume of carbon dioxide and 6.29 kilograms of acetic acid were passed over the catalyst per hour at 180° C under a pressure of 7 atmospheres gage. There were obtained, per hour, 7.05 kilograms of condensate having a content of allyl acetate of 22.0 percent by weight, corresponding to a catalyst yield of 430 grams of allyl acetate per liter of catalyst and per hour. The catalyst yield was still unchanged after 2,500 hours of working. The yield was 98 percent of allyl acetate, the remaining proportion being reacted to carbon dioxide and water.

COMPARISON EXAMPLE 3

970 grams of silicic acid carrier were impregnated with a solution of 40 grams of bismuth nitrate in 735 milliliters of water and 67 milliliters of concentrated nitric acid. The dried catalyst was introduced into 2 liters of a 5 percent potassium hydroxide solution, the supernatant potassium hydroxide solution was decanted and the catalyst was washed with water. The catalyst was then suction filtered, dried, impregnated with a solution of 40 grams of potassium acetate and 21.5 grams of palladium acetate in 730 milliliters of acetic acid and finally dried at 50° C under reduced pressure. The finished mixed catalyst contained about 1.95 percent by weight of palladium acetate, 6.5 percent by weight of potassium acetate and 1.56 percent by weight of bismuth in the form of acetates.

2 liters of the above catalyst were introduced into a reaction tube having an inside diameter of 33 millimeters and a length of 3 meters. A mixture of 450 Nl of nitrogen and 15 Nl of oxygen was passed per hour over the catalyst under a pressure of 5 atmospheres gage and the catalyst was heated to 180° C within 1 hour. During heating, 120 grams per hour of acetic acid were added to the gas stream after a temperature of 100° C had been reached, and 2,000 Nl per hour of propylene after reaching a temperature of 130° C. While further heating the catalyst to 180° C, the introduction of acetic acid was increased to 1,500 grams per hour and then the introduction of oxygen was gradually increased within 36 hours to 262 Nl per hour.

Under these final conditions an average catalyst yield of 250 grams of allyl acetate per liter of catalyst and per hour was obtained. The yield of allyl acetate calculated on the propylene which had been reacted was 96.5 percent in the first 600 hours of working, it then dropped slowly and was only 91.5 percent after 1,000 hours. The remaining proportion of the reacted propylene had been reacted with oxygen to carbon dioxide and water.

EXAMPLE 6

Under the conditions described in Comparison Example 3, propylene, oxygen, acetic acid and nitrogen were passed in the amounts indicated in that example over 2 liters of a fresh catalyst of the composition also described in Comparison Example 3. Each week one third of the catalyst was removed from the reactor inlet and introduced again at the reactor outlet without any treatment. With an average catalyst yield of 260 grams of allyl acetate per liter of catalyst and per hour and a yield of 96 percent calculated on the propylene which had been reacted, the selectivity was unchanged after 1,000 hours of working.

EXAMPLE 7

3 liters, corresponding to 1.18 kilograms, of a microspheroidal silicic acid, the spherical particles of which had an average diameter of 0.08 to 0.1 millimeter and which had a pore volume of 1.1 ml/g, were thoroughly mixed with a solution of 30 grams of crystalline bismuth nitrate in 57 milliliters of concentrated nitric acid and 1,200 milliliters of water and dried at 100° C in vacuo in a stream of nitrogen until the weight remained constant.

This carrier impregnated with bismuth was introduced into 6 liters of a 5 percent potassium hydroxide solution and suction filtered after 10 minutes. The wet filter cake was introduced, while stirring, into 6 liters of distilled water, suction filtered after 10 minutes and dried at 50° C under reduced pressure in a nitrogen atmosphere until the weight remained constant. The carrier impregnated with bismuth hydroxide was then impregnated at 75° C with a solution of 32.1 grams of palladium acetate, 60 grams of potassium acetate and 2.1 grams of copper acetate in 1,200 milliliters of acetic acid and dried at 50° C under reduced pressure in a nitrogen stream until the weight remained constant.

1 liter of the above catalyst was introduced into a fluidized bed reactor comprising a tube heated with oil and having an inside diameter of 50 millimeters and a length of 2 meters and which was provided with an additional tube 0.5 meter long and 150 millimeters in diameter to prevent removal of catalyst.

Under the initial conditions described in Comparison Example 3 the same amounts of nitrogen, oxygen, acetic acid and propylene were passed through the catalyst until, after a temperature of 180° C and the full introduction of oxygen had been reached, 450 Nl of nitrogen, 2000 Nl of propylene, 1,500 grams of acetic acid and 262 Nl of oxygen flowed over the catalyst.

Under these conditions, an average catalyst yield of 540 grams of allyl acetate per hour was obtained. The yield of allyl acetate calculated on the propylene which had been reacted was 97 percent. After 1,000 hours of working the efficiency of the catalyst and the yield were still unchanged.

EXAMPLE 8

For carrying out the process of Example 7 in a recycle gas apparatus, a reaction tube having an inside diameter of 50 millimeters and a length of 2.5 meters and provided with an enlarged pipe socket of a diameter of 150 millimeters and a length of 0.5 meter was used. The apparatus was furthermore provided with a recycle gas compressor, an acetic acid evaporator, a condenser and a condensation vessel. The oxygen was added to the recycle gas before the acetic acid evaporator. Fresh propylene was introduced on the suction side of the compressor. The carbon dioxide formed as a by-product was removed from the system to such an extent that a concentration of carbon dioxide of about 14.5 percent by volume was maintained in the recycle gas (without acetic acid).

The reactor was filled with 2 liters of the fluidized bed catalyst described in Example 6. 7.1 Nm³ of recycle gas consisting of about 76 percent by volume of propylene, 8 percent by volume of oxygen and 14.5 percent by volume of carbon dioxide and 3.75 kilograms of acetic acid were passed per hour over the catalyst at 180° C under a pressure of 7 atmospheres gage. 4.7 kilograms of condensate containing 33.1 percent by weight of allyl acetate were obtained per hour, which corresponded to a catalyst yield of 780 grams of allyl acetate per liter of catalyst and per hour. The yield of allyl acetate calculated on the propylene which had undergone reaction was 97 percent. No change in the efficiency and selectivity of the catalyst could be observed after 1,500 hours of working.

What is claimed is:

1. A process for the selective manufacture of allyl esters of a carboxylic acid selected from the group consisting of acetic acid, propionic acid, n-butyric acid, and i-butyric acid in the gaseous phase by the reaction of propylene, oxygen or gases containing oxygen, and a carboxylic acid as identified above, at elevated temperatures in the presence of a catalyst consisting essentially of an inert carrier material, a salt of a metal selected from the group consisting of ruthenium, rhodium, iridium, platinum, and palladium, and 0.1 and 25 percent by weight, calculated on the mixed catalyst, of an alkali metal salt of the carboxylic acid to be reacted, which comprises passing the starting products over the catalyst which contains in addition 0.01 to 20 percent by weight, calculated on the mixed catalyst, of bismuth.

2. The process of claim 1 where the catalyst contains in addition a salt of a metal selected from the group consisting of copper, iron, manganese, cerium, vanadium, antimony, lead, chromium, and titanium.

3. The process of claim 1 wherein the catalyst contains 0.1 to 5 percent by weight of bismuth.

4. The process of claim 1 wherein the bismuth is used in the form of a salt thereof.

5. The process of claim 1 wherein the bismuth is used in the form of a salt thereof with carboxylic acid.

6. The process of claim 1 wherein the bismuth is used in the form of a salt thereof with the carboxylic acid to be reacted.

7. The process of claim 1 wherein the noble metal compound is the salt of palladium with the carboxylic acid to be reacted.

* * * * *